United States Patent
Naruse

(10) Patent No.: US 8,564,821 B2
(45) Date of Patent: Oct. 22, 2013

(54) IMAGE PROCESSING APPARATUS FOR COMBINING IMAGES

(75) Inventor: Taketomo Naruse, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1116 days.

(21) Appl. No.: 12/326,828

(22) Filed: Dec. 2, 2008

(65) Prior Publication Data

US 2009/0147285 A1 Jun. 11, 2009

(30) Foreign Application Priority Data

Dec. 6, 2007 (JP) .................................. 2007-315958

(51) Int. Cl.
*G06K 15/00* (2006.01)
(52) U.S. Cl.
USPC ......................................... 358/1.16; 358/450
(58) Field of Classification Search
None
See application file for complete search history.

(56) References Cited

U.S. PATENT DOCUMENTS

| | | | |
|---|---|---|---|
| 5,872,864 A * | 2/1999 | Imade et al. | 382/176 |
| 6,424,963 B1 * | 7/2002 | Ito et al. | 707/999.003 |
| 6,507,415 B1 * | 1/2003 | Toyoda et al. | 358/450 |
| 6,549,302 B1 * | 4/2003 | Takeda et al. | 358/1.9 |
| 6,721,465 B1 * | 4/2004 | Nakashima et al. | 382/318 |
| 6,995,790 B2 * | 2/2006 | Higurashi et al. | 348/218.1 |
| 7,002,700 B1 * | 2/2006 | Motamed | 358/1.15 |
| 2002/0098003 A1 * | 7/2002 | Moteki | 399/2 |
| 2003/0133019 A1 * | 7/2003 | Higurashi et al. | 348/218.1 |
| 2003/0133612 A1 * | 7/2003 | Fan | 382/199 |
| 2004/0165207 A1 * | 8/2004 | Kashiwagi | 358/1.13 |
| 2006/0114488 A1 * | 6/2006 | Motamed | 358/1.13 |
| 2006/0256397 A1 * | 11/2006 | Cui | 358/450 |
| 2007/0024935 A1 * | 2/2007 | Yamamoto | 358/1.16 |
| 2007/0030510 A1 * | 2/2007 | Horiuchi | 358/1.15 |

FOREIGN PATENT DOCUMENTS

| | | |
|---|---|---|
| JP | 63-142991 A | 6/1988 |
| JP | 11-331556 A | 11/1999 |
| JP | 2003-69757 | 3/2003 |
| JP | 2006-119730 A | 5/2006 |

* cited by examiner

*Primary Examiner* — Twyler Haskins
*Assistant Examiner* — Nicholas Pachol
(74) *Attorney, Agent, or Firm* — Canon USA Inc. IP Division

(57) ABSTRACT

Joint images are end portions of respective read images and are portions to be joined together. The joint images are stored with a compression ratio lower than that with which the read images are stored. Then, the read images are joined together at relative positions determined on the basis of the joint images.

8 Claims, 14 Drawing Sheets

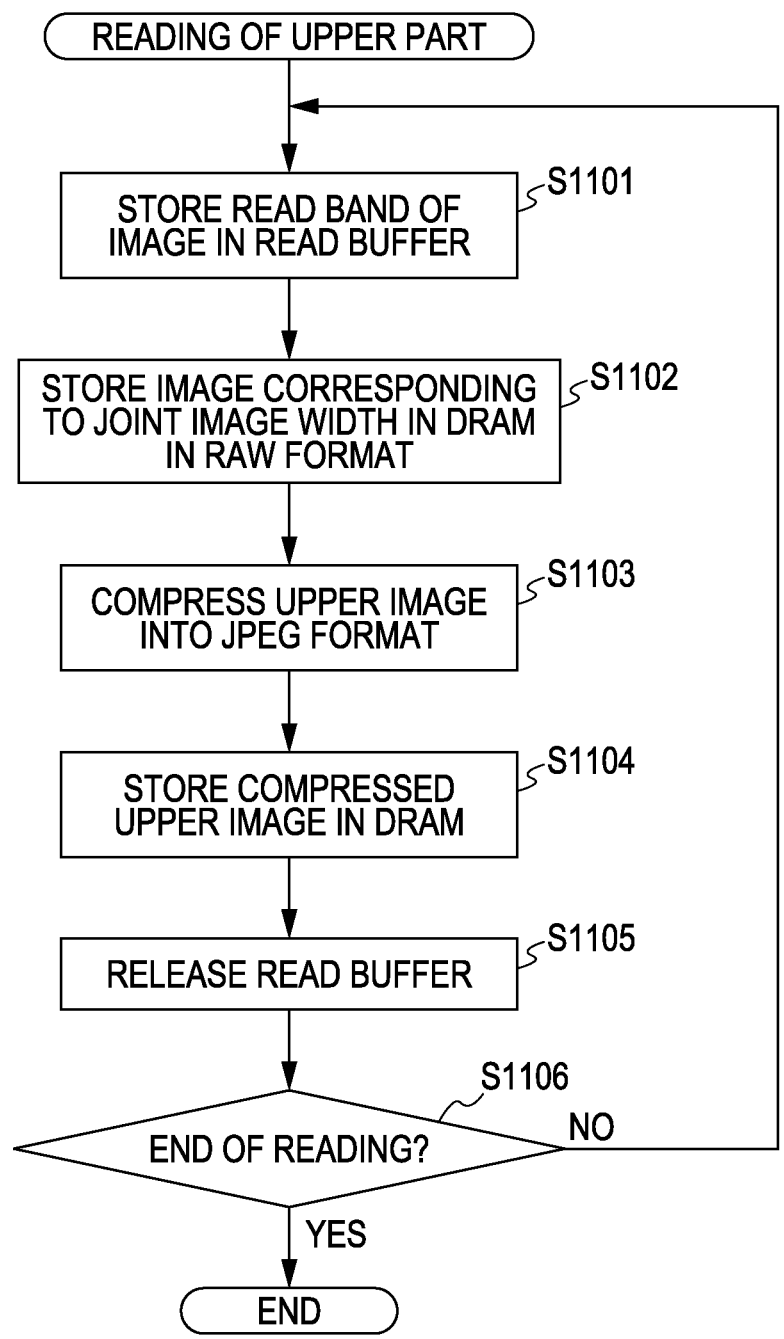

IMAGE PROCESSING APPARATUS FOR COMBINING IMAGES

BACKGROUND OF THE INVENTION

1. Field of the Invention

The present invention relates to image joining apparatuses capable of joining a plurality of read images together. In particular, the present invention relates to an image joining apparatus capable of reading a document and storing the read images in memory.

2. Description of the Related Art

There have been proposed apparatuses capable of reading a document larger in size than a document table in a plurality of parts, determining relative positions of the plurality of images read, joining the read images together, and recording the resulting image.

For example, Japanese Patent Laid-Open No. 63-142991 discloses a joining method in which, to analyze a correlation between a plurality of images stored in image memory, an image synthesizing processor calculates a mutual correlation coefficient f(τ) to determine positions at which the plurality of images are jointed together.

Similarly, Japanese Patent Laid-Open No. 2006-119730 discloses a method in which a correlation between joints of images to be joined is calculated.

Additionally, Japanese Patent Laid-Open No. 2003-69757 discloses a technique for reducing the amount of image memory used to store a plurality of images. This technique involves a process in which a one-page document is read line by line by a reading unit, the read image data is compressed, and the compressed image data is stored. By repeating this process, the one-page document is stored in image memory. Thus, when image compression is performed every time a part of the document is read, it is not necessary to store an uncompressed image of the one-page document in the image memory. In particular, if lossy compression, such as JPEG compression, which offers a high compression ratio is used, it is possible to further reduce the amount of image memory used.

Hereinafter, an example where a read image is subjected to lossy compression, such as JPEG compression, and stored in memory is referred to as a first known example.

On the other hand, there is a method in which a read image is stored as a RAW image. Here, the RAW image is either an uncompressed image or an image compressed by lossless compression. In the uncompressed image, each dot is expressed in an RGB color space. That is, the uncompressed image, which is obtained by simply converting the read data into the RGB color space, is not degraded. Also, the image compressed by lossless compression is not degraded by image expansion. Therefore, a RAW image is suitable for use in techniques disclosed in Japanese Patent Laid-Open No. 63-142991 and Japanese Patent Laid-Open No. 2006-119730 where a correlation between images is calculated.

Hereinafter, an example where a read image is stored as a RAW image in memory will be referred to as a second known example.

In the first known example, where a read image is stored in lossy compressed format, the amount of image memory used can be reduced. However, unlike the second known example where a read image is stored as a RAW image, the first known example suffers from image degradation caused by lossy compression. In particular, when a high-frequency portion, such as a text portion, is compressed in JPEG format, image degradation called mosquito noise occurs. Moreover, since the degraded image is used to calculate a correlation between images as described in Japanese Patent Laid-Open No. 63-142991, the accuracy of the calculation is lower than that in the second known example.

Therefore, as in the second known example, a read image may be stored as a RAW image in image memory. However, since the RAW image is an uncompressed image or a lossless-compressed image, its data size is larger than that of a lossy-compressed image, such as a JPEG image. That is, although the second known example provides higher accuracy in correlation calculation, the amount of memory necessary to store the image data is larger than that in the first known example. This means that the cost involved in manufacturing the apparatus is higher in the second known example.

SUMMARY OF THE INVENTION

The present invention has been made in view of the problems described above. The present invention provides an image joining apparatus capable of highly accurately joining a plurality of images together while suppressing the amount of image memory used.

According to an aspect of the present invention, there is provided an image joining apparatus including a reading unit, a memory, a first storage control unit, and a second storage control unit. The reading unit reads a document. The memory stores images read by the reading unit. The first storage control unit compresses and stores, in the memory, the images read by the reading unit. The second storage control unit stores, in the memory, joint images with a compression ratio lower than that with which the images read by the reading unit are compressed by the first storage control unit. The joint images are end portions of the respective read images and are portions to be joined together. The images stored by the first storage control unit are joined together at relative positions determined on the basis of the joint images stored by the second storage control unit.

Further features of the present invention will become apparent from the following description of exemplary embodiments with reference to the attached drawings.

BRIEF DESCRIPTION OF THE DRAWINGS

FIG. 11 is a detailed flowchart illustrating a process in which an upper part of a document is read and stored in a dynamic random-access memory (DRAM).

DESCRIPTION OF THE EMBODIMENTS

Hereinafter, embodiments of the present invention will be described in detail with reference to the drawings. Unless otherwise stated, relative arrangements of components, display screens, etc. described in the embodiments are not intended to limit the scope of the present invention.

In a first exemplary embodiment, a recording apparatus serving as an image joining apparatus reads a single document in two parts, joins the two read images together, and records the resulting image. In particular, in the present embodiment, a document table on which the document is read is half the size of the document. For example, on a document table corresponding to an A4-size document, an A3-size document is read in two parts, an upper part and a lower part.

To join the two read images together, end portions of the respective two read images, the end portions being portions to be joined together, are stored as joint images. Next, a correlation calculation is performed to analyze the correlation between the joint images. In accordance with the analysis, displacement between the two read images is corrected. Then, the resulting images are joined together and recorded on a recording sheet.

In the following description, to clarify the differences from the related art, the first and second known examples described above will be mentioned where appropriate.

Figure 1:
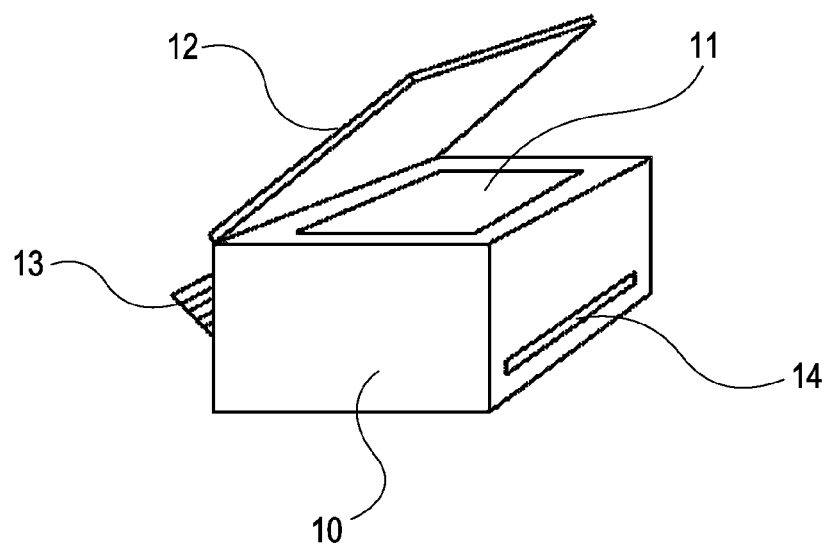
FIG. 1 is a perspective view of a recording apparatus serving as an image joining apparatus according to an embodiment of the present invention.

FIG. 1 is a perspective view of a recording apparatus serving as an image joining apparatus according to an embodiment of the present invention. The recording apparatus includes an apparatus main body 10, a document table 11 on which a document to be read is placed, a pressure plate 12 used to block out external light during reading of the document, a sheet insertion opening 13 into which recording sheets are inserted, and a sheet ejection opening 14 from which recording sheets are ejected.

Figure 2:
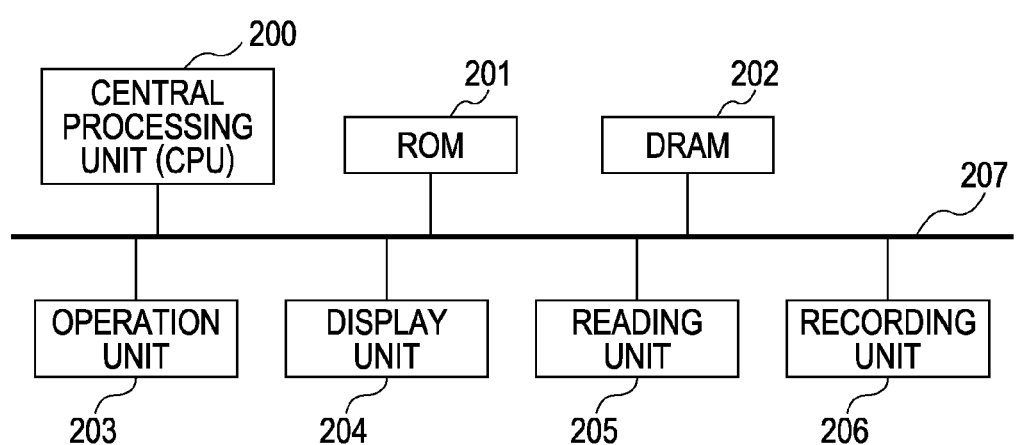
FIG. 2 is a block diagram illustrating a configuration of the recording apparatus of FIG. 1.

FIG. 2 is a block diagram illustrating a configuration of the recording apparatus of FIG. 1. The recording apparatus includes a central processing unit (CPU) 200, a ROM 201, a DRAM (storage unit) 202, an operation unit 203, a display unit 204, a reading unit 205, a recording unit 206, and a system bus 207.

The CPU 200 controls an overall operation of the recording apparatus. The ROM 201 stores programs and fixed data. Flowcharts described in the present embodiment are stored in the ROM 201 as programs. Processes shown as the flowcharts can be implemented by loading the programs into the CPU 200 and executing them. The DRAM 202 includes a temporary storage area, such as image memory. Images read by the reading unit 205 are stored in the DRAM 202. The operation unit 203 includes keys to be operated by the user. The display unit 204 displays screen information, including graphics and messages. The graphics and/or messages may be displayed in color. The reading unit 205 reads a document. The recording unit 206 may have an inkjet mechanism. The system bus 207 is used for data communication between different parts of the recording apparatus.

Figure 3:
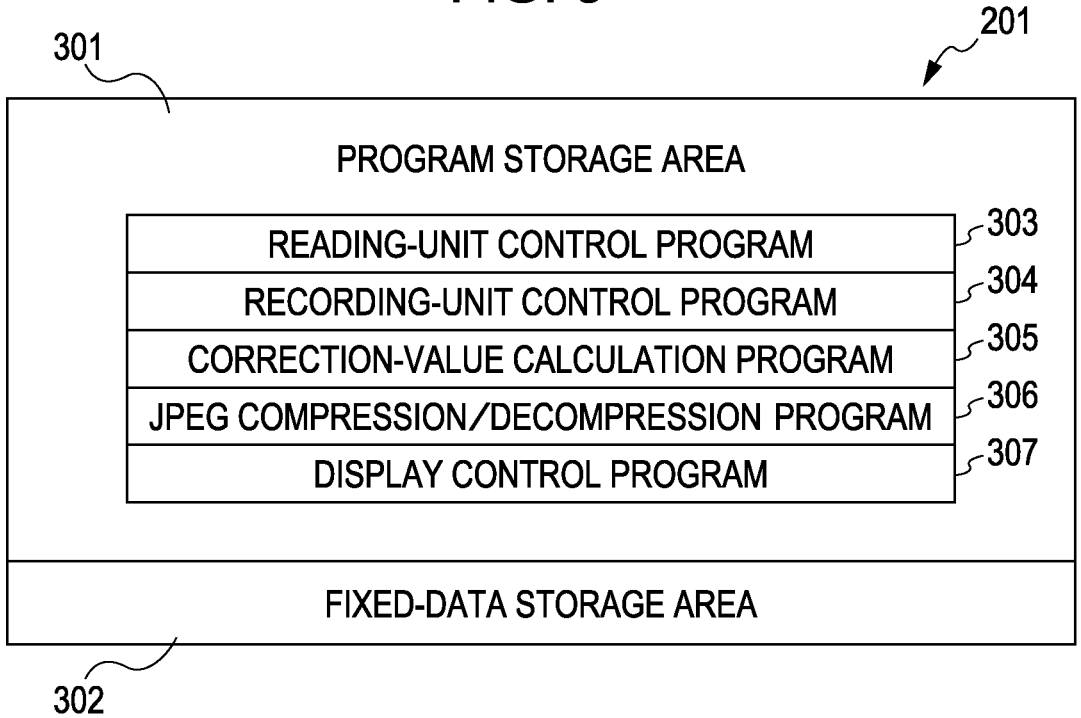
FIG. 3 illustrates an internal structure of a read-only memory (ROM) of FIG. 2.

FIG. 3 illustrates an internal structure of the ROM 201 of FIG. 2. The ROM 201 includes a program storage area 301 and a fixed-data storage area 302. Programs stored in the program storage area 301 are primarily as follows: a reading-unit control program 303, a recording-unit control program 304, a correction-value calculation program 305, a JPEG compression/decompression program 306, and a display control program 307. Fixed data, such as data about sizes of recording sheets, is stored in the fixed-data storage area 302.

The reading-unit control program 303 is for controlling the reading unit 205. The recording-unit control program 304 is for controlling the recording unit 206. The correction-value calculation program 305 is for calculating a correlation between a plurality of images stored in the DRAM 202, and thus determining a correction value for correcting displacement between the plurality of images. Examples of algorithms for correcting displacement between a plurality of images include those disclosed in Japanese Patent Laid-Open No. 63-142991 and Japanese Patent Laid-Open No. 2006-119730 described above. The JPEG compression/decompression program 306 is for performing JPEG compression/decompression, which is lossy compression/decompression. The display control program 307 is for displaying images etc. on the display unit 204 of FIG. 2.

Figure 4:
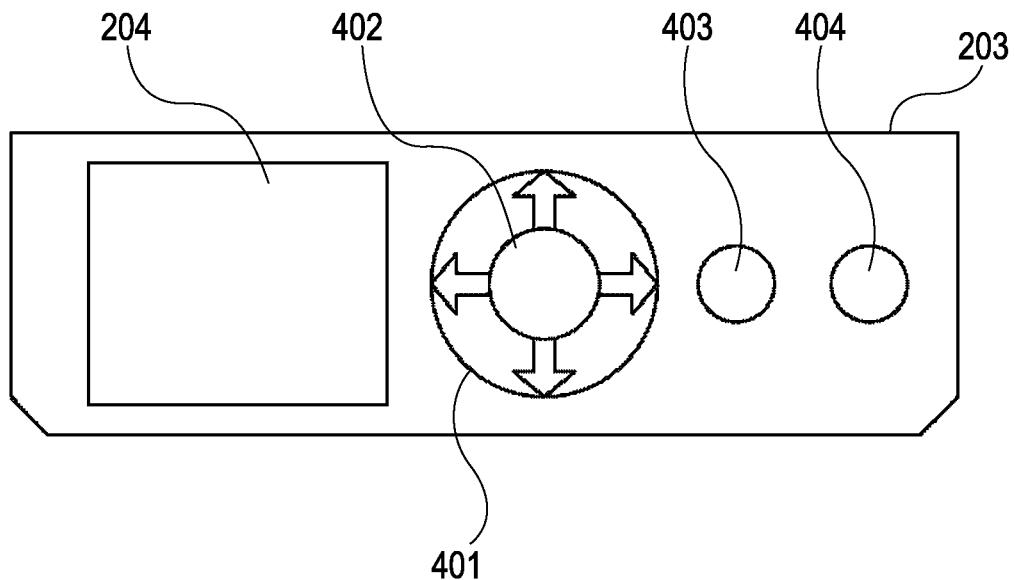
FIG. 4 is a plan view illustrating an operation unit and a display unit of FIG. 2.

FIG. 4 is a plan view illustrating the operation unit 203 and display unit 204 of FIG. 2. The display unit 204 is a display screen displaying images, operation menus, etc. Examples of the display unit 204 include a dot-matrix liquid crystal display (LCD). Arrow keys 401 are used to move a cursor on the display unit 204. A set key 402 is used to enter settings. A function key 403 is used to set function settings. A start key 404 is used to execute a function, for example, to start a recording operation.

Figure 5:
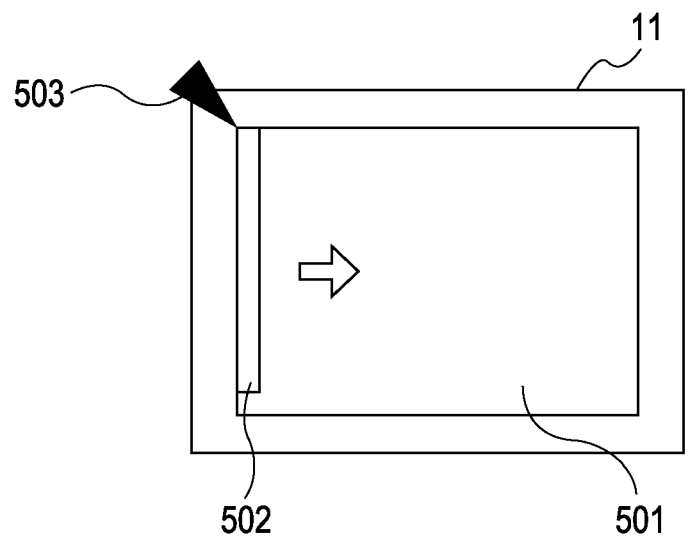
FIG. 5 illustrates a reading unit of FIG. 2 in detail.

FIG. 5 illustrates the reading unit 205 of FIG. 2 in detail. The reading unit 205 includes the document table 11, a glass plate 501 on which a document is set, a reading sensor 502 reading the document, and a document position marker 503 indicating a position at which the document is to be set by the user. Upon start of a reading operation, the reading sensor 502 moves in the direction of the arrow in FIG. 5 to read the document.

Figure 6:
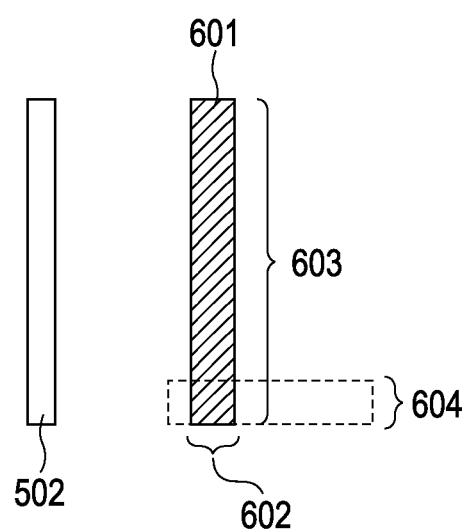
FIG. 6 illustrates a relationship, during reading of a document, between a reading sensor and an image to be stored in image memory in accordance with a first embodiment of the present invention.

FIG. 6 illustrates a relationship, during reading of a document, between the reading sensor 502 and an image to be stored in image memory in accordance with the first embodiment.

A unit image 601 is a segment of an image read by the reading sensor 502 and stored in a read buffer. The unit image 601 is to be stored in the DRAM 202. That is, in an image reading operation, an image having a width of a read band 602 is stored in the read buffer. Then, a part of the image stored in the read buffer, the part corresponding to an image storage width 603, is stored in the DRAM 202. In an operation of reading the entire document, in accordance with movement of the reading sensor 502, images each corresponding to the read band 602 are sequentially stored in the read buffer. Then, parts of the respective images stored in the read buffer, that is, the unit images 601 each corresponding to the image storage width 603 are sequentially accumulated in the DRAM 202.

In the present embodiment, the reading width of the reading sensor 502 corresponds to the A4 size and is substantially half the size of an A3-size document. Therefore, in the present embodiment, a read image can be simply stored in the DRAM 202, and a width read by the reading sensor 502 can be set as the image storage width 603.

A joint image width 604 is a width of an end portion of an image, the end portion being a portion to be joined to the corresponding end portion. In other words, the joint image width 604 is a width of a joint image that is an image of a joint. Thus, on the basis of this joint image, displacement between a plurality of read images can be corrected.

Figure 7:
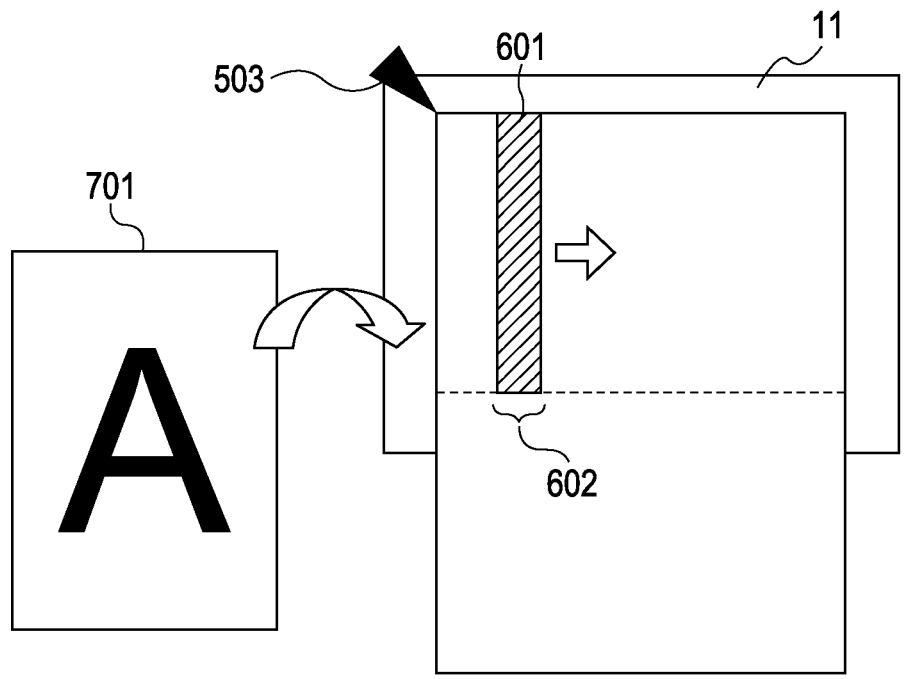
FIG. 7 illustrates a state in which an upper part of a document is read on a document table during reading of the document in two parts, the upper and lower parts.

FIG. 7 illustrates a state in which an upper part of a document is read when the reading unit 205 of FIG. 2 reads the document in two parts, the upper and lower parts.

In FIG. 7, a document to be read is an A3-size document 701, while the document table 11 corresponds to an A4-size document. An upper part of the A3-size document 701 is placed on the glass plate 501 with the read surface face down. As illustrated, the A3-size document 701 is placed such that the upper-right corner of its read surface coincides with the point indicated by the document position marker 503. Upon start of the reading operation, the upper part of the A3-size document 701 is read in the direction of the right-pointing arrow in FIG. 7, and the read image is stored in the DRAM 202 on the unit image 601 basis.

Figure 8:
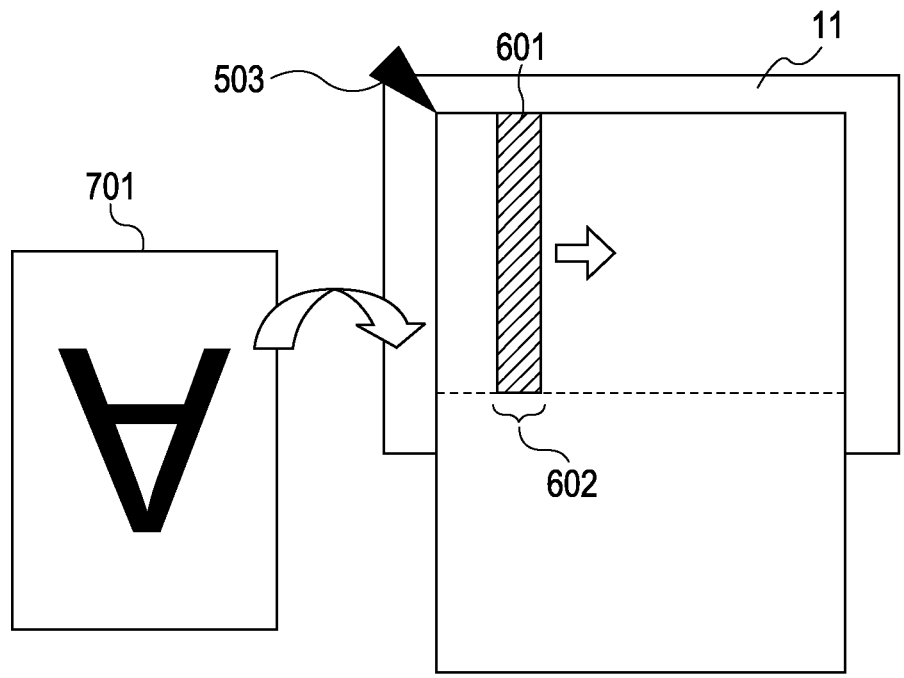
FIG. 8 illustrates a state in which, after the upper part of the document is read on the document table as illustrated in FIG. 7 and the document is turned upside down, the lower part of the document is read.

FIG. 8 illustrates a state in which, after the upper part of the A3-size document 701 is read as illustrated in FIG. 7 and the A3-size document 701 is turned upside down, the lower part of the A3-size document 701 is read. The A3-size document 701 is read in the same manner as that illustrated in FIG. 7.

Figure 9:
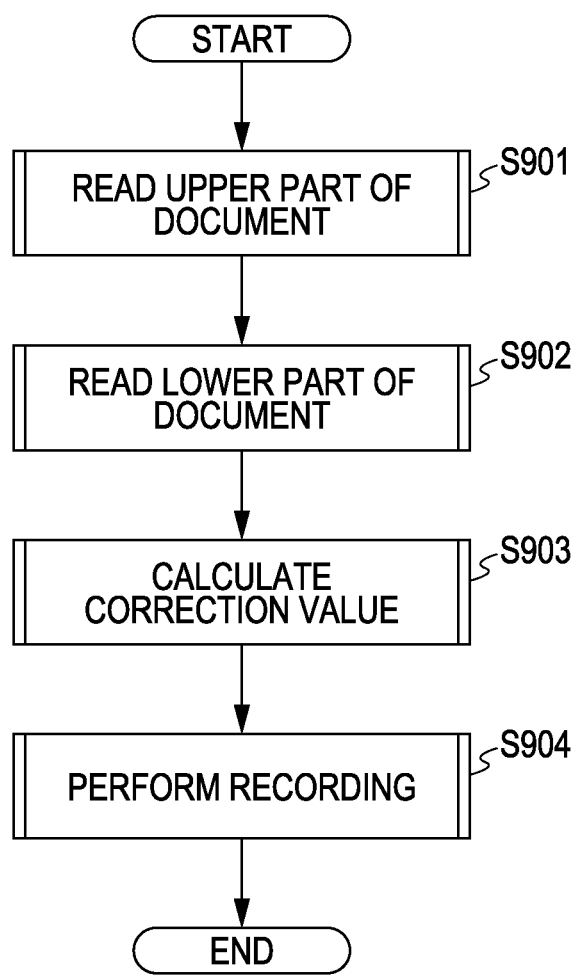
FIG. 9 is a flowchart illustrating an overall operation of the recording apparatus of the first embodiment.

FIG. 9 is a flowchart illustrating an overall operation of the recording apparatus of the first embodiment.

In step S901, an upper part of a document is read and stored as an upper image in the DRAM 202. In step S902, a lower part of the document is read and stored as a lower image in the DRAM 202. In step S903, a correlation calculation is performed to analyze a correlation between joints of the respective upper and lower images, so that a correction value for correcting displacement between the upper and lower images is determined. In step S904, the upper and lower images stored in steps S901 and S902, respectively, are expanded. On the basis of the correction value calculated in step S903, displacement between the upper and lower images is corrected. Then, the resulting images are joined together and recorded.

For example, when an A3-size document is read in two parts, an upper part and a lower part, on the document table 11 corresponding to an A4-size document, the read images are A4-size images. Then, to join the read images together, it is necessary to reduce their size to half the A4-size. This size reduction may be performed in steps S901 and S902 where the read images are stored in the DRAM 202, or in step S904 where the stored images are expanded.

Additionally, after the lower part of the document is read, it is necessary to turn the lower image upside down before the upper and lower images are joined together. This turning operation may be performed either in step S902 where the lower image is stored in the DRAM 202 or in step S904 where the stored images are expanded.

In the first known example described above, when the upper and lower parts of the document are read in steps S901 and S902 of FIG. 9, the read images are compressed and stored in the DRAM 202 in JPEG format. As described above, this can reduce the amount of memory necessary to store the read images. However, since the images degraded by JPEG compression/decompression are used to calculate a correlation between joints of the images, the accuracy of the calculation decreases.

In the second known example described above, when the upper and lower parts of the document are read in steps S901 and S902 of FIG. 9, the read images are stored in the DRAM 202 as RAW images. As described above, this can improve the accuracy of correlation calculation, but cause an increase in the amount of memory necessary to store the read images.

Figure 10A:
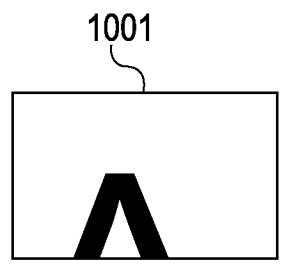
FIG. 10A and FIG. 10B illustrate an upper image and a lower image, respectively.
Figure 10B:
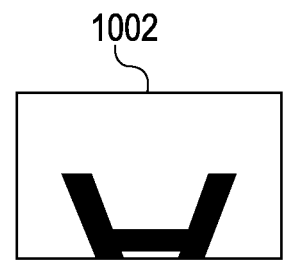
Figure 10C:
FIG. 10C and FIG. 10D illustrate an upper joint image and a lower joint image, respectively.
Figure 10D:
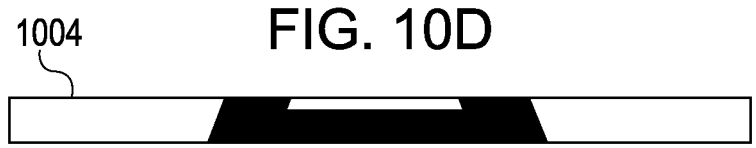

On the other hand, in the present invention, when the upper part of the document is read in step S901 of FIG. 9, the read image, that is, an upper image 1001 of FIG. 10A is compressed and stored in the DRAM 202 in JPEG format (which is a highly compressed format) as an image to be recorded. In other words, the upper image 1001 is stored in the same manner as that of the first known example described above. Additionally, a part of the upper image 1001, that is, an upper joint image 1003 of FIG. 10C is stored in RAW format (which is free from degradation caused by compression) for use in calculation of a correlation between joints. In step S902, in the same manner as that of step S901, a lower image 1002 of FIG. 10B is compressed in JPEG format and stored in the DRAM 202, while a lower joint image 1004 of FIG. 10D is stored in RAW format. FIG. 10A to FIG. 10D show that the upper image 1001 is slightly off the desired position. Therefore, in step S903, a correction value for correcting the displacement between the upper joint image 1003 and the lower joint image 1004 is calculated. Then, in step S904, in accordance with the correction value calculated in step S903, the upper image 1001 and the lower image 1002 are corrected and joined together to form and record a corrected image 1005 of FIG. 10E.

Hereinafter, with reference to FIG. 11, FIG. 12, and FIG. 13, each step of the flow illustrated in FIG. 9 and performed by the recording apparatus of the present embodiment will be described in detail.

FIG. 11 corresponds to step S901 of FIG. 9. That is, FIG. 11 is a detailed flowchart illustrating a process in which an upper part of a document is read and stored in the DRAM 202.

In step S1101, the reading sensor 502 reads the upper part of the A3-size document 701. Then, image data having the width of the read band 602 is stored in the read buffer. In step S1102, a part of the image data stored in step S1101, the part being an image corresponding to the joint image width 604, is stored in RAW format in the DRAM 202. In step S1103, a part of the image data stored in step S1101, the part being an upper image corresponding to the image storage width 603, is compressed into JPEG format using the JPEG compression/decompression program 306. In step S1104, the upper image compressed in JPEG format in step S1103 is stored in the DRAM 202. In step S1105, the read buffer is released. In step S1106, it is determined whether reading of the upper part of the A3-size document 701 has been completed. If not, the process returns to step S1101, from which the reading operation continues. If it is determined in step S1106 that the reading has been completed, the present process ends.

Upon completion of the flow of FIG. 11, as a first storage control operation, the upper image 1001 of FIG. 10A is JPEG-compressed and stored in the DRAM 202. Likewise, upon completion of the flow of FIG. 11, as a second storage control operation, the upper joint image 1003 of FIG. 10C is stored in RAW format in the DRAM 202.

In the recording apparatus of the present embodiment, the process of step S902 in FIG. 9, that is, the process in which a lower part of the document is read and stored in the DRAM 202 can be carried out by performing the process similar to that of FIG. 11. Specifically, a part of read image data, the part being an image of a joint, such as the lower joint image 1004 of FIG. 10D, is stored in RAW format in the DRAM 202. Then, an image corresponding to the image storage width 603, such as the lower image 1002 of FIG. 10B, is compressed into JPEG format using the JPEG compression/decompression program 306 and stored in the DRAM 202.

Thus, in the recording apparatus of the present embodiment, an image to be recorded is JPEG-compressed and stored. Therefore, the amount of memory used can be reduced from that in the second known example, and is not significantly increased from that in the first known example.

Figure 12:
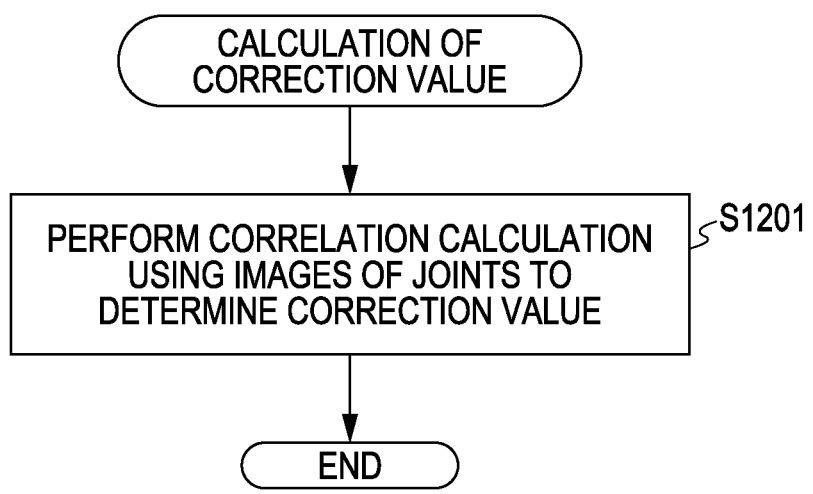
FIG. 12 is a detailed flowchart illustrating a process in which a correction value for correcting displacement between upper and lower images read is calculated.

FIG. 12 corresponds to step S903 of FIG. 9. That is, FIG. 12 is a detailed flowchart illustrating a process in which a correction value for correcting displacement between upper and lower images read is calculated.

In step S1201, a correlation calculation is performed using joint images stored in RAW format in the DRAM 202 to analyze the correlation between the joint images. Thus, a correction value for correcting displacement between the upper and lower images is determined.

As described above, since joint images stored as RAW images are used in the correlation calculation, the correlation can be calculated with the same degree of accuracy as that achieved in the second known example. Additionally, since RAW images are less degraded than JPEG-compressed images, the correlation calculation can be done more accurately than that in the first known example.

Moreover, in the first known example described above, it is necessary to decompress and expand joints of the JPEG images. However, in the present invention, since joints are stored in RAW format, it is not necessary to perform a complicated decompression process on the joint images. Examples of algorithms used in step S1201 to calculate a correlation between joint images include those disclosed in Japanese Patent Laid-Open No. 63-142991 and Japanese Patent Laid-Open No. 2006-119730 described above.

Figure 10E:
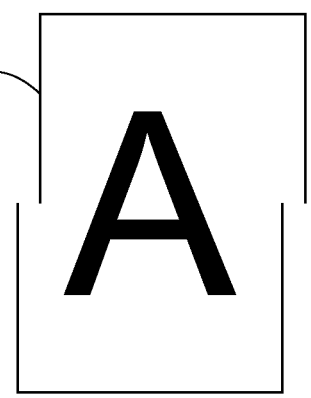
FIG. 10E illustrates an image formed by joining the upper and lower images together.
Figure 13:
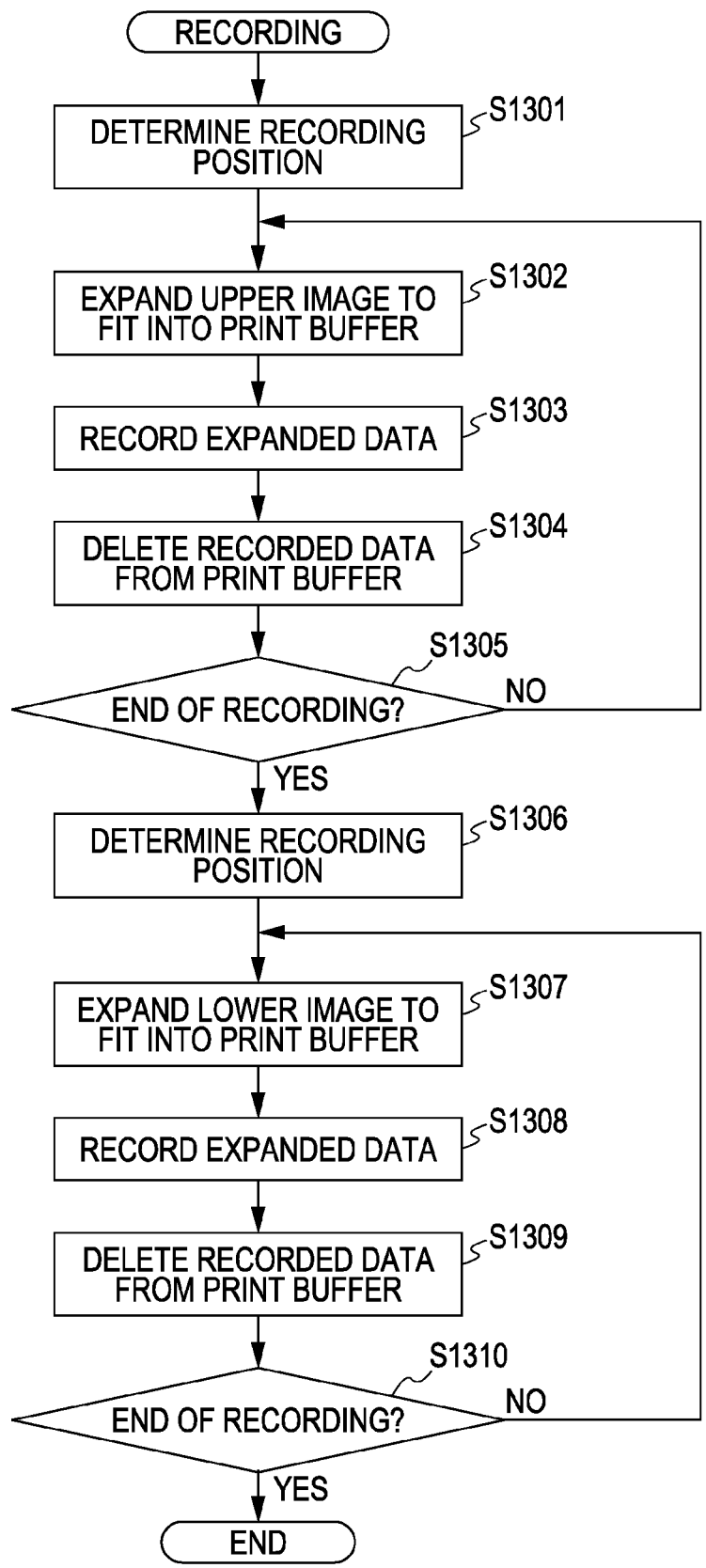
FIG. 13 is a detailed flowchart illustrating a process in which displacement between images is corrected, the images are joined together, and the resulting image is recorded.

FIG. 13 corresponds to step S904 of FIG. 9. That is, FIG. 13 is a detailed flowchart illustrating a process in which displacement between upper and lower images is corrected, the images are joined together, and the resulting image, such as the corrected image 1005 of FIG. 10E, is recorded. This process is based on the premise that the upper and lower images are already reduced to half the A4 size.

In step S1301, on the basis of the correction value calculated in step S1201 of FIG. 12, it is determined to what extent the upper image is to be shifted for recording. In step S1302, a part of the upper image stored in the DRAM 202, the part corresponding to the size of a print buffer, is expanded. In step S1303, the data expanded in the print buffer is recorded on the recording sheet using the recording-unit control program 304. In step S1304, the recorded data is deleted from the print buffer. In step S1305, it is determined whether recording of the upper image stored in the DRAM 202 has been completed. If the recording has not been completed, the process returns to step S1302, from which the recording operation continues. If it is determined in step S1305 that the recording has been completed, the process proceeds to step S1306.

In step S1306, on the basis of the correction value calculated in step S1201 of FIG. 12, it is determined to what extent the lower image is to be shifted for recording. In step S1307, a part of the lower image stored in the DRAM 202, the part corresponding to the size of the print buffer, is expanded. In step S1308, the data expanded in the print buffer is recorded on the recording sheet using the recording-unit control program 304. In step S1309, the recorded data is deleted from the print buffer. In step S1310, it is determined whether recording of the lower image stored in the DRAM 202 has been completed. If the recording has not been completed, the process returns to step S1307, from which the recording operation continues. If it is determined in step S1310 that the recording has been completed, the present process ends.

As described above, in the first storage control operation of the present invention, a part of the read image, the part corresponding to the image storage width 603, is stored in JPEG format, which is a highly compressed format, joined to the corresponding part, and recorded. Additionally, in the second storage control operation of the present invention, a part of the read image, the part corresponding to the joint image width 604, is stored in RAW format, which is free from degradation caused by compression, and used to calculate a correlation between images to be joined together. Thus, the amount of memory used is not significantly increased from that in the first known example and, at the same time, a correlation between joint images can be calculated with the same degree of accuracy as that achieved in the second known example.

Figure 14:
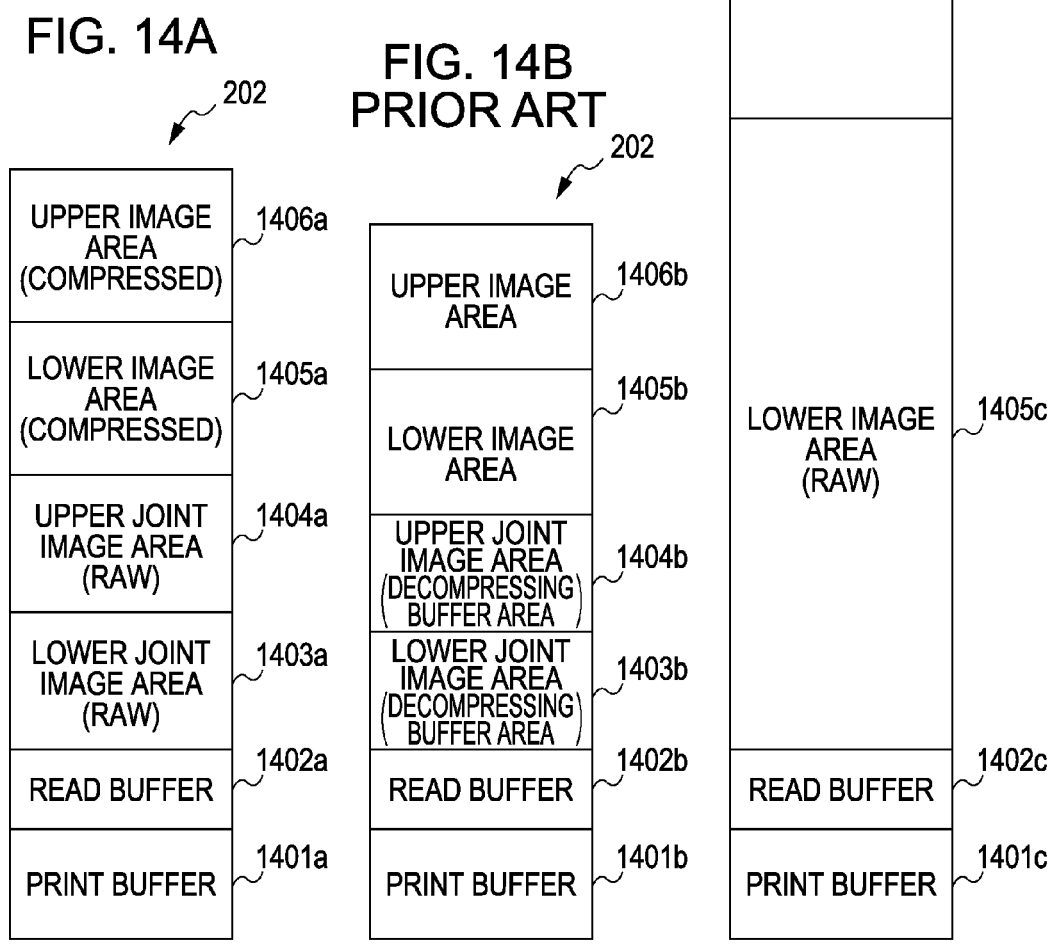
FIG. 14A to FIG. 14C illustrate internal structures of the DRAM in which images read in accordance with the present invention, the first known example, and the second known example, respectively, are stored.

FIG. 14A to FIG. 14C each illustrate an internal structure of the DRAM 202 of the recording apparatus. Specifically, FIG. 14A to FIG. 14C illustrate internal structures of the DRAM 202 in which images read in accordance with the present invention, the first known example, and the second known example, respectively, are stored.

FIG. 14A illustrates an internal structure of the DRAM 202 according to an embodiment of the present invention.

A print buffer 1401a is for temporarily storing image data converted for recording. Data is transmitted from the print buffer 1401a to the recording unit 206 of FIG. 2 and recorded.

A read buffer 1402a is a buffer area of the DRAM 202. Image data read by the reading unit 205 is stored in the read buffer 1402a. Of the image data stored in the read buffer 1402a, an upper image corresponding to the image storage width 603 is compressed in JPEG format by the JPEG compression/decompression program 306 and stored in an upper image area 1406a. Similarly, a lower image area 1405a is an area in which a lower image obtained by reading a lower part of the document and compressed in JPEG format is stored. The lower image is stored in the lower image area 1405a in the same manner as that in the case of the upper image area 1406a. The image data stored in the upper image area 1406a and the lower image area 1405a is used in the recording process of FIG. 13.

An upper joint image area 1404a is an area in which an image corresponding to a joint of the upper image is stored in RAW format. Similarly, a lower joint image area 1403a is an area in which an image corresponding to a joint of the lower image is stored in RAW format. The image data stored in the upper joint image area 1404a and the lower joint image area 1403a is used to calculate a correction value for correcting displacement between the upper and lower images to be joined together, in other words, used to determine the relative positions of the upper and lower images.

The images of the joints are included in the respective upper and lower images. However, in the present embodiment, the images of the joints are stored separately from the upper and lower images, and used for correcting displacement between the upper and lower images to be joined together. Alternatively, parts of the respective upper and lower images may be stored as joints in RAW format, while the other parts of the respective upper and lower images may be JPEG-compressed and stored. With this method, however, in addition to a seam between the upper and lower images, a seam between a joint and the other part is formed in each of the upper and lower images.

FIG. 14B illustrates an internal structure of the DRAM 202 of the recording apparatus in which the method of the first known example is used. Like FIG. 14A, the internal structure of FIG. 14B includes a print buffer 1401b for temporarily storing image data and a read buffer 1402b for storing image data. However, FIG. 14B is different from that of FIG. 14A in that image areas for joint images, that is, an upper joint image area 1404b and a lower joint image area 1403b of FIG. 14B serve as buffer areas for decompressing and expanding joints of JPEG images that are already stored in an upper image area 1406b and a lower image area 1405b. In other words, in the first known example, the joint images initially stored as JPEG images are expanded and used to correct displacement between the upper and lower images to be joined together.

FIG. 14C illustrates an internal structure of the DRAM 202 of the recording apparatus in which the method of the second known example is used. Like FIG. 14A, FIG. 14C includes a print buffer 1401c for temporarily storing image data and a read buffer 1402c for storing image data. However, the internal structure of FIG. 14C is different from that of FIG. 14A in that RAW images are stored in upper and lower image areas, that is, in an upper image area 1406c and a lower image area 1405c. At the same time, in the second known example, since all read images are originally stored as RAW images, it is not necessary to provide image areas for joint images.

As described above, in the present invention, images are stored in the DRAM 202 in the formats different from those used in the first and second known examples. That is, in the present invention, images to be joined together are stored in JPEG format, while images of joints are stored in RAW format. Therefore, the amount of memory used is not significantly increased from that in the first known example. At the same time, images can be joined together with the same degree of accuracy as that achieved in the second known example.

Figure 15:
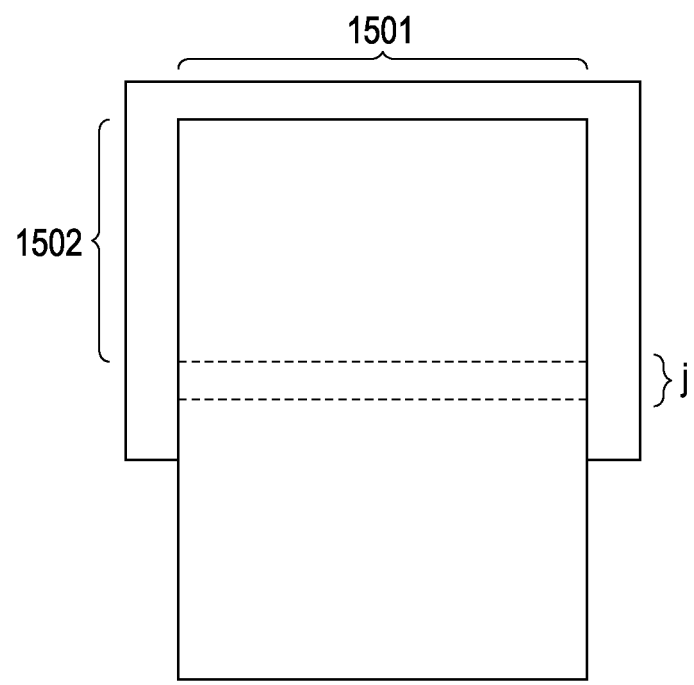
FIG. 15 illustrates a relationship between sizes of a document table and a document.

FIG. 15 illustrates a relationship between sizes of a document table and a document. With reference to FIG. 15, the amount of memory used in the present invention is compared with those in the first and second known examples. In FIG. 15, for example, an upper part of an A3-size document is read by a reading sensor corresponding to the A4-size. In FIG. 15, a region surrounded by a dotted line corresponds to a joint image, which is stored in RAW format and used in correlation calculation. The joint image has a joint image width (j) shown in FIG. 15.

In the A3-size document, the upper part is 29.7 cm in width ("W" indicated by reference numeral 1501) and 21.0 cm in length ("L" indicated by reference numeral 1502), which is half the length of the longer side of the document. Thus, a size S of a read image can be expressed by equation (a) as follows:

$$S = L \times W \quad (a)$$

The amounts of memory necessary in the present invention, the first known example, and the second known example can be expressed by equations (b), (c), and (d), respectively, as follows:

$$\text{Present Invention } Sa = L \times W \times r2 + j \times W \times r1 \quad (b)$$

$$\text{First Known Example } Sb = L \times W \times r2 + j \times W \times r2 \quad (c)$$

$$\text{Second Known Example } Sc = L \times W \times r1 \quad (d)$$

where r1 denotes an average ratio of compressed data size to uncompressed data size in RAW format (e.g., lossless compression), while r2 denotes an average ratio of compressed data size to uncompressed data size in JPEG format. Thus, the ratio of the amounts of memory necessary in the present invention, the first known example, and the second known example can be expressed as Sa:Sb:Sc.

For example, if the joint image width (j) is 1.05 cm, and r1 is five times greater than r2, the equations $L = 20 \times j$ and $r1 = 5'r2$ can be given. Here, the ratio of the amounts of necessary memory, Sa:Sb:Sc, can be expressed by equation (e) as follows:

$$Sa:Sb:Sc = 0.25:0.21:1 \quad (e)$$

This shows that the amount of memory used in the present invention is not significantly larger than that in the first known example.

A second embodiment is described next in which the size of the document table is greater than half that of a document and when the upper and lower parts of the document are to be joined together, the image storage width 603 and the joint image width 604 are not uniquely determined.

For example, there may be a case where a B4-size document is read in two parts, upper and lower parts, on the document table corresponding to the A4-size, displacement between the upper and lower images is corrected, and the resulting image is recorded.

Figure 16:
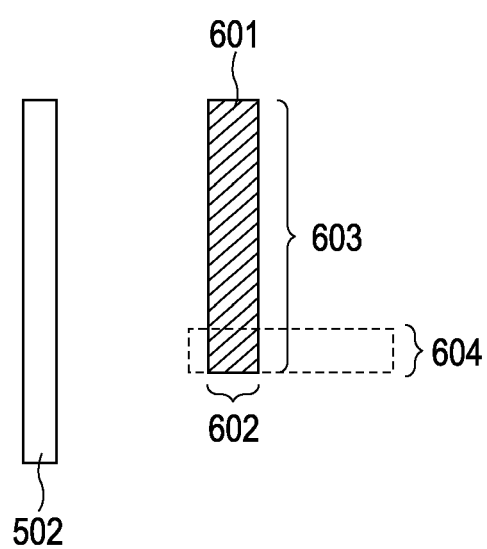
FIG. 16 illustrates a relationship between the reading sensor and an image to be stored in image memory in accordance with a second embodiment of the present invention.

FIG. 16 illustrates a relationship between the reading sensor 502 and an image to be stored in image memory in accordance with the second embodiment.

As illustrated, the reading sensor 502 corresponds to the A4-size, while the image storage width 603 is substantially half the B4-size. That is, instead of the entire image read by the reading sensor 502 and stored in the read buffer, the unit image 601 of FIG. 16 is stored in image memory.

Figure 17:
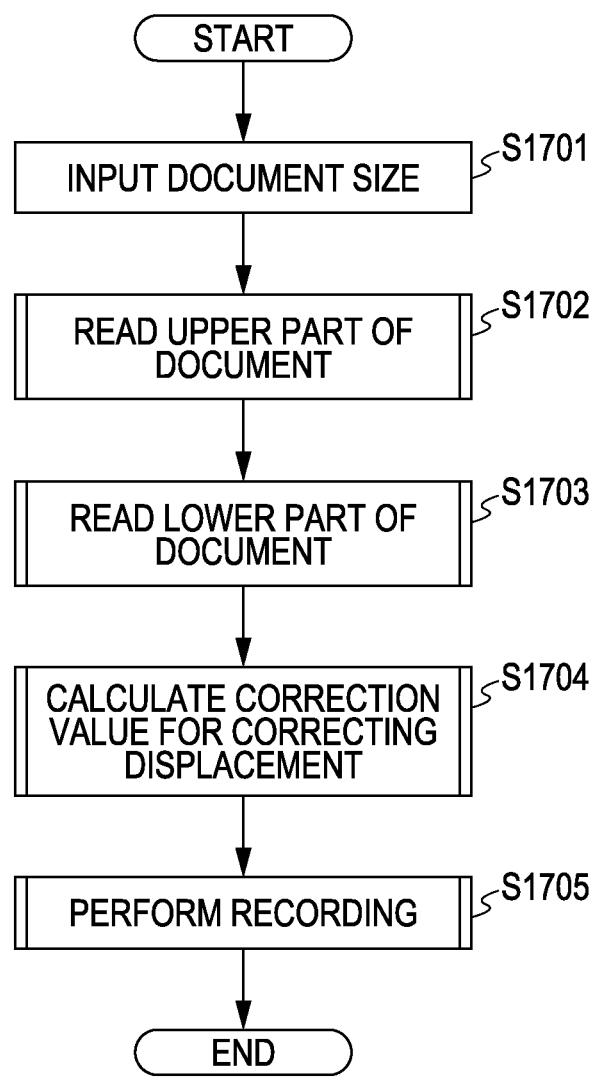
FIG. 17 is a flowchart illustrating an overall operation of the second embodiment.

FIG. 17 is a flowchart illustrating an overall operation of the second embodiment.

Figure 18:
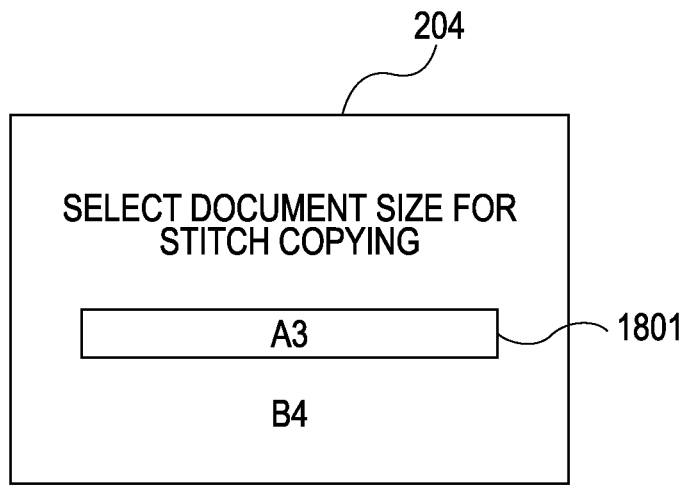
FIG. 18 illustrates a display example displayed on the display unit in accordance with the second embodiment.

In step S1701, a user instruction specifying the size of a document to be read is input. A display, such as that illustrated in FIG. 18, is displayed on the display unit 204 to the user. While viewing the display on the display unit 204, the user uses the arrow keys 401 on the operation unit 203 of FIG. 4 to move a focus 1801, and presses the set key 402 of FIG. 4 to select and specify the document size. In response to this, the image storage width 603 and the joint image width 604 are determined.

For example, when the user selects a B4-size document, the image storage width 603 and the joint image width 604 are determined by referring to data about the length and width of the selected B4-size document, the data being stored in the fixed-data storage area 302 of FIG. 3.

The process then proceeds to step S1702, where an upper image is stored. An image corresponding to the joint image width 604 determined in step S1701 is stored as a RAW image, which is less degraded, while an image corresponding to the image storage width 603 determined in step S1701 is stored as a JPEG image. In step S1703, a lower image is stored in the same manner as that in step S1702. In step S1704, a correction value for correcting displacement between joints of the upper and lower images stored in steps S1702 and S1703, respectively, is calculated. In step S1705, on the basis of the correction value calculated in step S1704, the displacement between the joints of the upper and lower images is corrected, the upper and lower images are joined together, and the resulting image is recorded. Then, the present flow ends.

Thus, by performing the process of FIG. 17, the present invention is applicable even to the case where the image storage width 603 and the joint image width 604 are not uniquely determined.

In the first embodiment described above, since the size of the document table corresponds to half that of the document, an overlapping area between the upper and lower images may not be sufficient. However, the present embodiment can ensure a greater overlapping area between the upper and lower images, and thus allows a more accurate calculation of a correlation between the joints.

In a third embodiment of the present invention, a correlation calculation for determining a correction value is not performed. Instead, the user manually corrects displacement between joints. In the first and second embodiments described above, a correlation calculation is performed as shown in step S903 of FIG. 9 and step S1704 of FIG. 17. However, in the present embodiment, the user corrects displacement between images of joints displayed on the display unit 204.

Figure 19:
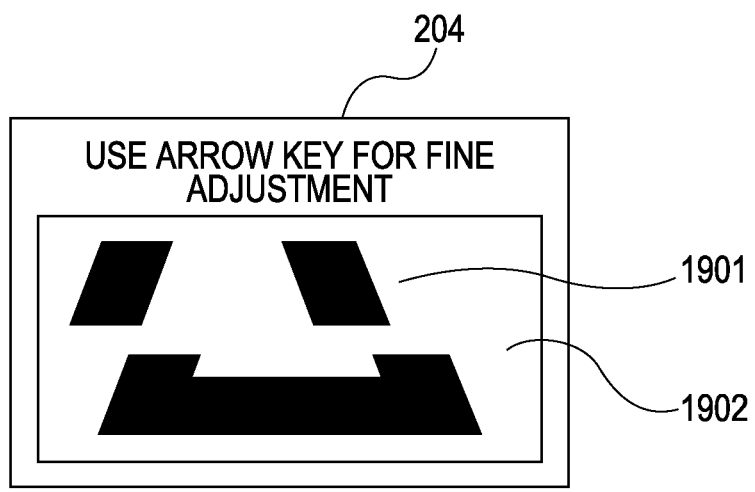
FIG. 19 illustrates a display example displayed on the display unit in accordance with a third embodiment of the present invention.

FIG. 19 illustrates a display example displayed on the display unit 204 in accordance with the third embodiment. An image 1901 stored in the upper joint image area 1404a and an image 1902 stored in the lower joint image area 1403a are displayed on the display screen by the display control program 307 of FIG. 3. While viewing the display screen, the user operates the arrow keys 401 of FIG. 4. In accordance with an instruction input by the user, movement control of the displayed images 1901 and 1902 is performed; that is, the images 1901 and 1902 are moved on the display screen to correct displacement between joints. Then, at relative positions determined, images stored in the upper image area 1406a and the lower image area 1405a are joined together.

In the present embodiment, again, images of joints are stored in RAW format. Therefore, the images of joints can be displayed on the display unit 204 more clearly than in the case where they are stored as lossy-compressed images, such as JPEG images.

Thus, the present invention can provide improved accuracy of correction not only in the case where a correlation calculation is performed to correct displacement between images, but also in the case where the user manually corrects such displacement.

If skewed images of a document are read, joint images may be rotated to correct the skew. Therefore, in the present embodiment, the use of the arrow keys 401 may allow the user to rotate images. Alternatively, for example, if the apparatus is provided with a wheel device, the use of the wheel device may allow the user to rotate images.

In a fourth embodiment of the present invention, a single document is read in three or more parts and joining of the resulting images is performed multiple times.

When joining of images is performed multiple times, the number of times the operations of steps S901 and S902 of FIG. 9 are performed may be increased. At the same time, the number of blocks in each of the upper image area 1406a, the lower image area 1405a, the upper joint image area 1404a, and the lower joint image area 1403a in the DRAM 202 may be increased.

Figure 20:
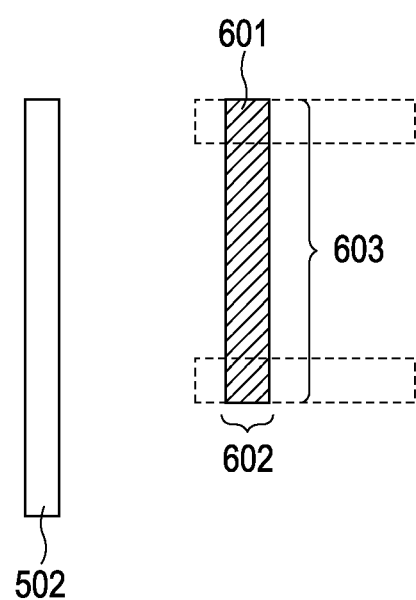
FIG. 20 illustrates a relationship between the reading sensor and an image to be stored in image memory in accordance with a fourth embodiment of the present invention.

FIG. 20 illustrates a relationship between the reading sensor 502 and an image to be stored in image memory in accordance with the fourth embodiment. In the present embodiment, the number of joints to be stored is increased. This means that the number of images stored in RAW format is increased. That is, even when the number of images to be joined together is increased, the effect of the present invention can be obtained by increasing the number of joints to be read.

In the embodiments of the present invention described above, joints of read segmented images are stored in RAW format. However, even when such images are stored in lossy compressed format, such as JPEG format, the effect of the present invention can be obtained by storing them with a compression ratio lower than that of images used for recording.

Also, in the embodiments described above, the recording apparatus joins images together and records the resulting image. However, the image joining apparatus of the present invention is not limited to this. The effect of the present invention can be obtained even when the resulting image formed by joining images is displayed on the display screen or stored as a file.

Alternatively, instead of being read by the image joining apparatus, a document may be read in parts by the recording apparatus, and the read images may be input and joined together by the image joining apparatus.

The present invention can be provided when a computer-readable storage medium in which a program for implementing the present invention is recorded is supplied to a system or an apparatus, and a computer (or a CPU or microprocessing unit (MPU)) of the system or apparatus reads and executes the program code.

In this case, the program code read out of the storage medium realizes the functions of the above-described embodiments.

Examples of the computer-readable storage medium for supplying the program code include a floppy disk, a hard disk, an optical disk, a magneto-optical disk, a compact-disk read-only memory (CD-ROM), a CD-recordable (CD-R), a magnetic tape, a non-volatile memory card, and a ROM.

Additionally, in accordance with an instruction of the program code read out of the storage medium, an operating system (OS) or the like running on the computer may perform all or a part of the actual processing so that the functions of the above-described embodiments can be implemented by this processing.

Furthermore, the program code read out of the computer-readable storage medium can be written to a function expansion board inserted in the computer or to a memory provided in a function expansion unit connected to the computer. Then, in accordance with an instruction of the program code, a CPU or the like mounted on the function expansion board or function expansion unit which may perform all or a part of the actual processing so that the functions of the above-described embodiments can be implemented by this processing.

As described above, in the present invention, when a document larger in size than the document table is read in parts and the read images are joined together, images of joints for determining relative positions of the read images to be joined are stored with a compression ratio lower than that of the read images to be joined. This makes it possible to achieve accurate joining of images while reducing the amount of memory used.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-315958 filed Dec. 6, 2007, which is hereby incorporated by reference herein in its entirety.

What is claimed is:

1. An image processing apparatus comprising:
    an acquiring unit configured to acquire a plurality of images to be combined;
    a first storage control unit configured to compress the plurality of images acquired by the acquiring unit with a first compression ratio and store the compressed plurality of images in a memory, the stored plurality of images including first combining images corresponding to combining portions of the respective plurality of images;
    a second storage control unit configured to store, in a memory, second combining images corresponding to the combining portions of the respective plurality of images in a non-compressed format or a compressed format compressed with a second compression ratio lower than the first compression ratio;
    a determining unit configured to determine a layout of the plurality of images stored by the first storage control unit, based on the second combining images corresponding to the combining portions stored by the second storage control unit; and
    an outputting unit configured to output the plurality of images, including the first combining images, which are compressed with the first compression ratio and stored in the memory by the first storage control unit, so that the plurality of images are combined according to the layout determined by the determining unit.

2. The image processing apparatus according to claim 1, further comprising:
    a display control unit configured to display, on a display screen, the second combining images stored by the second storage control unit,
    wherein the determining unit determines the layout of the plurality of images corresponding to relative positions of the combining images on the display screen, in accordance with an instruction from a user based on the displaying by the display control unit.

3. The image processing apparatus according to claim 2, further comprising:
    a movement control unit configured to move, on the display screen, the displayed second combining images in accordance with an instruction from a user,
    wherein the determining unit determines the layout of the plurality of images corresponding to relative positions of the second combining images moved by the movement control unit.

4. The image processing apparatus according to claim 1, further comprising an analyzing unit configured to analyze a correlation between the second combining images stored by the second storage control unit,
    wherein the determining unit determines the layout of the plurality of images based on the correlation analyzed by the analyzing unit.

5. The image processing apparatus according to claim 1, further comprising an input unit configured to input an instruction for specifying a size of the respective plurality of images to be combined,
    wherein a size of the combining portions is set based on the size specified by the instruction input by the input unit.

6. The image processing apparatus according to claim 1, wherein the second storage control unit stores the second combining images in a lossless compressed format as the compressed format.

7. An image processing method comprising:
    acquiring a plurality of images to be combined;
    compressing the acquired plurality of images with a first compression ratio and storing the compressed plurality of images in a memory, the stored plurality of images including first combining images corresponding to combining portions of the respective plurality of images;
    storing, in a memory, second combining images corresponding to the combining portions of the respective plurality of images in a non-compressed format or a compressed format compressed with a second compression ratio lower than the first compression ratio;
    determining a layout of the plurality of images which are compressed with the first compression ratio, based on the second combining images corresponding to the combining portions stored in a non-compressed format or a compressed format compressed with the second compression; and
    outputting the plurality of images, including the first combining images, which are compressed with the first compression ratio and stored in the memory, so that the plurality of images are combined according to the determined layout.

8. A non-transitory computer-readable storage medium which stores a program for causing a computer to execute the method according to claim 7.

* * * * *